W. CORFIELD.
Making Illuminating Fluid.
No. 54,060.            Patented Apr. 17, 1866
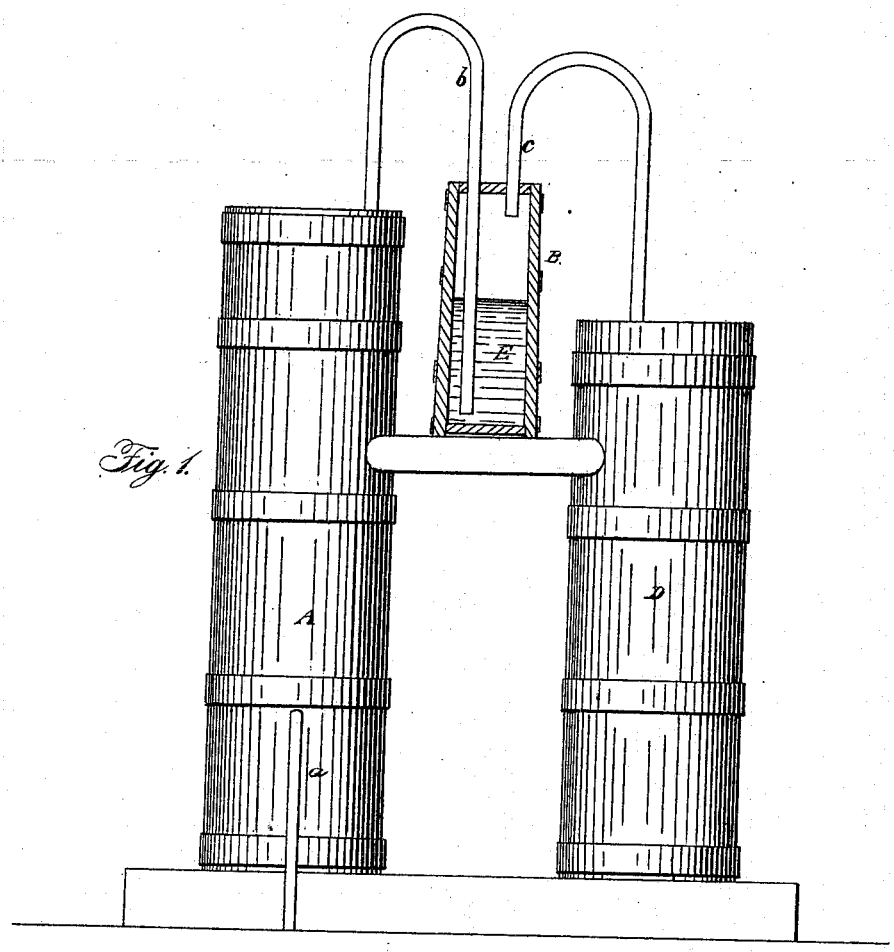
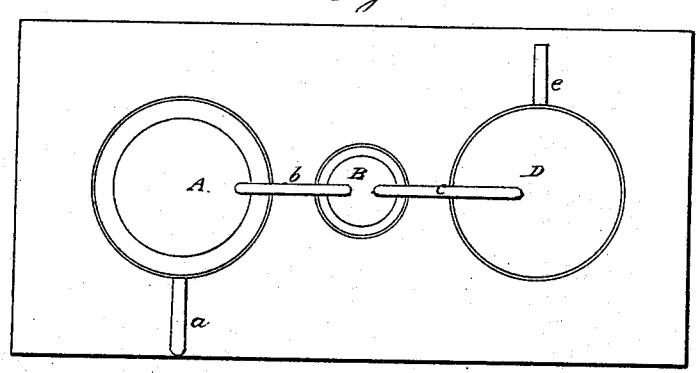

UNITED STATES PATENT OFFICE.

WILLIAM CORFIELD, OF PHILADELPHIA, PENNSYLVANIA, ASSIGNOR TO HIMSELF AND J. A. DOUGHERTY & SONS.

IMPROVEMENT IN THE MANUFACTURE OF BURNING-FLUID.

Specification forming part of Letters Patent No. 54,060, dated April 17, 1866.

*To all whom it may concern:*

Be it known that I, WILLIAM CORFIELD, of Philadelphia, Pennsylvania, have invented an Improvement in the Manufacture of Fluid for Illuminating and other Purposes; and I do hereby declare the following to be a full, clear, and exact description of the same, reference being had to the accompanying drawings, and to the letters of reference marked thereon.

My invention consists of the cheap and simple process of manufacturing fluid for illuminating and other purposes by causing alcoholic vapors from a still to pass through spirits of turpentine or unite with the vapors of the same, condensing the united vapors, and subsequently redistilling the product, all substantially as described hereinafter.

On reference to the accompanying drawings, which form a part of this specification, Figure 1 represents a view, partly in section, of apparatus for carrying out my invention, and Fig. 2 a plan view of Fig. 1.

A is a still, such as commonly used for distilling spirits from fermented preparations of grain, &c., by the direct action of steam.

The interior arrangement of stills of this class is too well understood by those familiar with the process of distillation to require a minute description. It will suffice to observe that *a* is the steam-pipe and *b* the pipe through which the vapor passes to the doubler B, containing a supply of spirits of turpentine, into which the end of the said pipe *b* is immersed, so that the vapor must pass through and take up or absorb part of the turpentine before it reaches the pipe C, the latter being continued in the form of a coil through the condenser D, and the vapor, by passing through this coil, being converted into a milky fluid, which, on being redistilled, and thereby deprived of most of its water, becomes an available fluid for illuminating and other useful purposes. Any ordinary still capable of producing ninety-five per cent. alcohol may be used for the redistillation of this milky fluid.

The proportion of the fermented liquor placed in the still A to the quantity of turpentine contained in the doubler B should be about five hundred gallons of the former to about five gallons of the latter.

Instead of causing the alcoholic vapor to pass through the spirits of turpentine the latter may be vaporized by the application of steam or other heat, and the vapors thus generated made to unite with those from the still at any point between the latter and the condenser. In either case it will be evident that the process is much more simple than that heretofore practiced of manufacturing burning-fluid from alcohol and turpentine.

I claim as my invention and desire to secure by Letters Patent—

Causing the alcoholic vapors from a still to pass through spirits of turpentine, or to unite with the vapors of the same, substantially in the manner and for the purpose described.

In testimony whereof I have signed my name to this specification in the presence of two subscribing witnesses.

WM. CORFIELD.

Witnesses:
  H. HOWSON,
  W. J. R. DELANY.